Aug. 22, 1939.  C. MACBETH  2,170,565
SPRING SUSPENSION FOR FORK-MOUNTED WHEELS
Filed Sept. 23, 1938    2 Sheets-Sheet 1
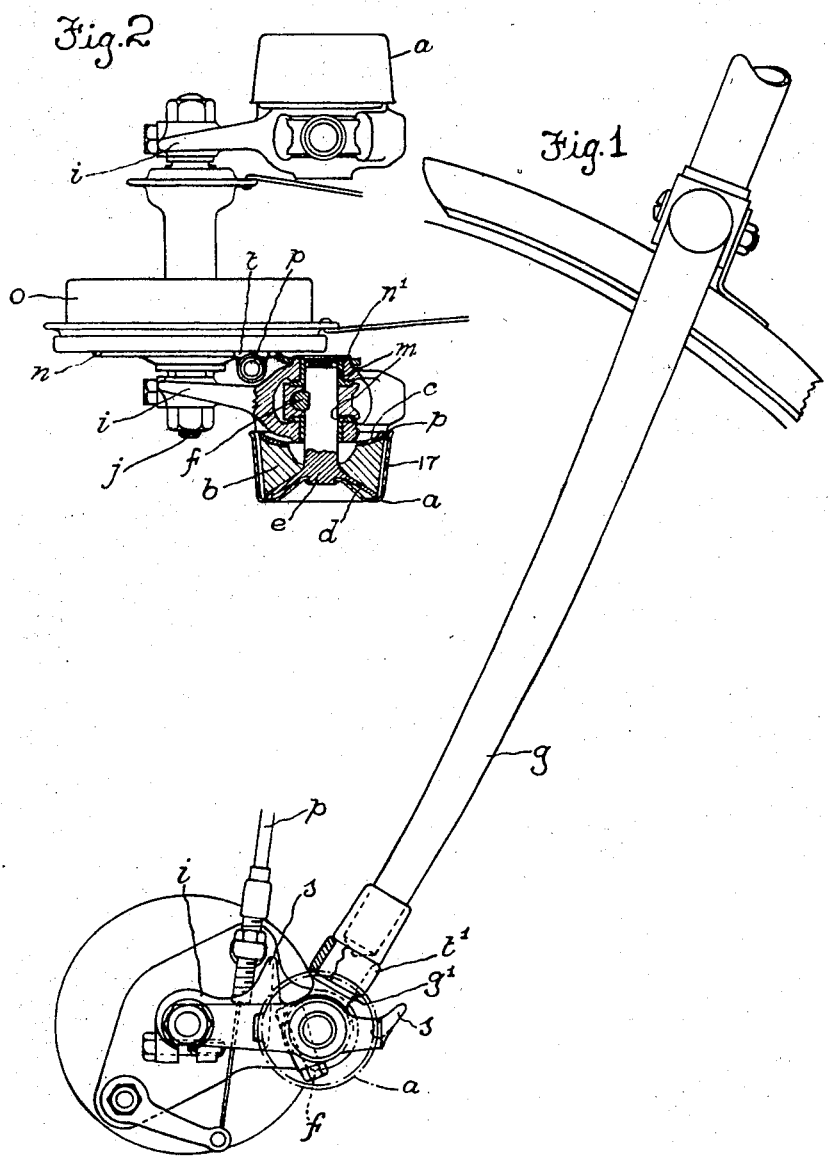
INVENTOR
COLIN MACBETH
BY
ATTORNEY

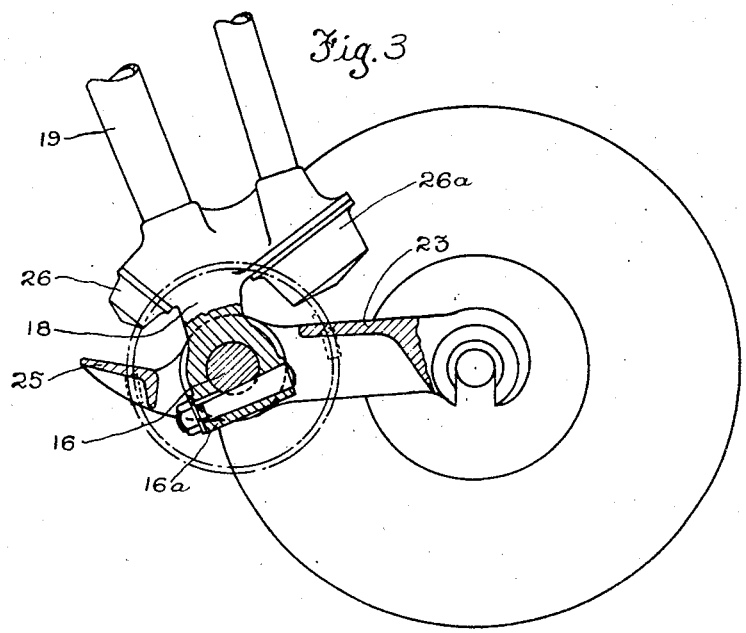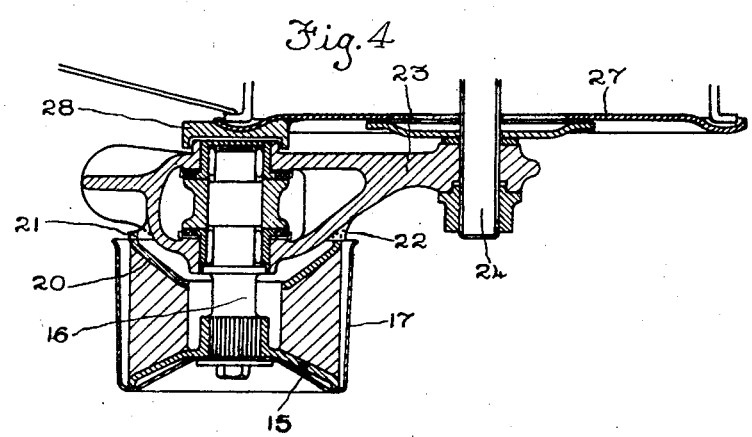

Patented Aug. 22, 1939

2,170,565

UNITED STATES PATENT OFFICE 2,170,565

SPRING SUSPENSION FOR FORK-MOUNTED WHEELS

Colin Macbeth, Birmingham, England

Application September 23, 1938, Serial No. 231,358
In Great Britain May 26, 1937

2 Claims. (Cl. 280—286)

This invention relates to improvements in spring suspensions for the wheels of pedal cycles, motor cycles, and like vehicles, and is particularly concerned with suspensions for the fork-mounted wheels of such vehicles.

The principal object of the present invention is to provide an improved suspension employing springs of the torsion type which, while enabling the centre of gravity of the vehicle to be desirably low, will not interfere with the use of standardized brake and detachable wheel parts.

According to this invention a torsion suspension comprising a rubber block attached by vulcanisation to metal plates is distinguished by one of said plates being anchored to the lower end of a rigid fork, and the other plate being connected by an arm or link to the wheel axle or spindle. Such an arrangement enables the suspension unit to be disposed relatively low so that the centre of gravity of the vehicle is advantageously low. The arrangement also enables the suspension to be economically incorporated in pedal cycles and cycles having motor driving attachments. A rubber suspension unit may be disposed on each side of the wheel, each unit having one of its plates rigidly connected by a link or lever to the wheel axle or spindle to form a crank arm. The link or lever of each unit may be provided with an arm adapted to abut against a resilient stop associated with the fork for preventing excessive movement between the parts. One end of the suspension link or lever may be chambered and bifurcated for receiving bearings disposed around the spindle of a rubber unit and for embracing on each side the lower end of the fork, or a bracket thereon.

In order to enable the invention to be readily understood, reference will now be made to the accompanying drawings, illustrating by way of example, different constructions for carrying the invention into effect, in which drawings:

Figure 1 is a side elevation showing a fork for a pedal cycle with a suspension arrangement in accordance with these improvements.

Figure 2 is a plan view of the lower part of Figure 1, one of the rubber units on one side of the wheel being shown in section.

Figure 3 is a sectional side elevation of a modified construction, particularly suitable for light motor cycles, and Figure 4 is a central horizontal section of Figure 3.

Referring to Figures 1 and 2, a torsional spring $a$ is disposed on each side of the wheel. Each spring comprises a rubber block $b$ vulcanized to inner and outer plates $c$ $d$. The outer plate $d$ of each spring is formed as a flange on a spindle $e$ which is rigidly attached by means of a cotter pin $f$ to a bracket $g^1$ brazed on the lower end of the fork $g$ having the usual steering handle bars. The inner plate $c$ of each spring is notched at $h$ for engagement with a crank arm or link $i$ secured at one end in any suitable manner to the spindle $j$ of the wheel, and having pivotal connection at its other end with spindle $e$. Each link $i$ is formed with a relatively large vertically extending opening through its rear end for receiving the bracket $g^1$ and end of fork $g$, there being bearings $m$ around the spindle $e$ on each side of the fork bracket $g^1$ mounted in the link structure at each side of said opening therein. The plate $n$ of the brake drum $o$, for housing brake shoes operated by a cable $p$, is rigidly secured to one of the links. Thus a bored hole in the plate $n$ registers with a boss $n^1$ on the inner face of the link $i$, the plate having suitable means for attaching the brake cable anchorage, such as a lug $t$. Each of the links is formed with a pair of upwardly extending nose-like projections $s$ adapted to engage with a rubber buffering sleeve $t^1$ disposed around the lower end of the fork for restricting the oscillation of the links about the fixed spindle $e$. Thus the stops limit any exceptional rising movement (and the corresponding rebound) which the wheel and links may tend to make under fierce brake application. A protective shield 17 is provided for each rubber unit.

According to the modified construction illustrated in Figures 3 and 4, the outer plate 15 of each rubber unit is splined to its spindle 16 which is secured by a cotter pin 16ª to a bracket 18 on the lower end of the fork arms 19. The inner plate 20 of each unit is notched at 21 for engagement with lugs 22 on the link 23 secured at one end to the wheel spindle 24 and formed at its other with an arm 25 adapted to abut against a "rebound" rubber stop 26. A "bound" rubber buffer 26ª is provided for engagement by the link. These anti-concussive stops serve to limit excessive movement and any rebound, as previously described.

The brake plate 27 mounted on the wheel spindle 24 is prevented from rotating due to brake reaction, by providing on its outer face a countersunk part for registering with a boss 28 on the link 23. The invention provides a rigid mounting for the fork-mounted front or rear wheels of vehicles such as pedal bicycles, tandems, motor cycles, three-wheeled carrier carts, and certain types of trailers, while retaining the advantages of a self-damping torsional rubber suspension. The arrangement permits easy detachment of the wheel for tire repairs and ensures lateral rigidity of the fork and wheel assembly for keeping the wheel in its correct track without lateral displacements thereof in respect to the suspension link and fork members.

Although the invention has been illustrated with reference to undriven fork-mounted wheels, it is to be understood that it is applicable also to the fork-mounted rear driven wheels.

Having described my invention what I claim and desire to secure by Letters Patent is:

1. In a cycle or like vehicle having a fork for mounting a wheel and a rubber spring on each side of the wheel connected with the lower end of the fork by an arm secured to the wheel axle, the combination including a torsion rubber spring disposed centrally around a spindle at the lower ends of the fork and comprising a rubber block disposed between and vulcanized to metal plates, means for non-revolubly connecting one of said plates to the fork through the agency of said spindle, an arm for securing the other plate to the wheel axle, said arm having a relatively large vertically extending opening through an end portion thereof to receive the lower end of the fork, bearings for the ends of the spindle mounted in the arm structure at each side of said opening therein, upwardly extending abutments on said arm disposed forwardly and rearwardly of said opening, and anti-concussive stop means on the lower end of said fork and disposed above said arm for engagement by said abutments.

2. A combination as defined in claim 1 including a brake drum plate mounted on the wheel axle and formed with a recess, and a boss formed on a lateral face of the arm and engaged in said recess for preventing rotation of said plate.

COLIN MACBETH.